United States Patent [19]
Lawlor et al.

[11] 3,824,711
[45] July 23, 1974

[54] EDUCATIONAL DEVICE

[75] Inventors: John Lawlor, Tappan, N.Y.; John Sgombick, Ramsey, N.J.

[73] Assignee: Xerox Corporation, Stamford, Conn.

[22] Filed: Dec. 26, 1972

[21] Appl. No.: 318,314

[52] U.S. Cl. ............................................. 35/19 R
[51] Int. Cl. ......................................... G09b 23/12
[58] Field of Search ............. 35/19 R; 177/207, 264, 177/232, 233, 254; 128/218 P

[56] References Cited
UNITED STATES PATENTS
3,705,582  12/1972  Stumpf ........................... 128/218 P OTHER PUBLICATIONS
Boyle's Law Apparatus, page 24 of the Project Physics Course Catalog from Holt, Rinehart and Winston, Sept. 22, 1972.

Primary Examiner—Harland S. Skogquist

[57] ABSTRACT

A simple, durable, and inexpensive educational device for demonstrating pressure-volume relationships especially adapted for use by educational institutions below the college level is described. The device comprises a chamber for containing a gas, said chamber having openings at its upper and lower end portions. Piston means is provided for selectively controlling the volume and pressure of the gas in the chamber, the piston means capable of being inserted in the chamber through the opening at its upper end portion. Means are included for sealing the lower opening in the chamber. The device also includes a base member for supporting the chamber at its lower end portion, the base member adapted to be in releasable engagement with the chamber.

11 Claims, 4 Drawing Figures

PATENTED JUL 23 1974   3,824,711

EDUCATIONAL DEVICE

BACKGROUND OF THE DISCLOSURE

1. Field of the Invention

This invention relates to educational devices, and more particularly to an educational device for demonstrating pressure-volume relationships.

2. Description of the Prior Art

The earliest quantitive description of the effect of pressure on the volume of a confined gas was made by Robert Boyle (1627–1691). The relationship he discovered (PV = constant), known as Boyle's Law, states that for a confined gas the product of pressure of the gas and the volume of the gas remains constant. That is, if the volume of a confined gas is decreased, its pressure will increase (and vice versa) in such a way that the product of pressure and volume will not change.

A device for demonstrating pressure-volume relationships is a fundamental teaching tool for learning institutions, especially for those institutions below the college level. By using such a device not only is the student given the opportunity to learn pressure-volume relationships, but also he is given an opportunity to perform independently the complete sequence of behaviors involved in experimenting: constructing a hypothesis based on observations, designing a test of the hypothesis, interpreting data from the test, describing how the data support or do not support the hypothesis and, if necessary, revising the hypothesis and testing it again. Although efforts have been made to construct simple, relatively inexpensive, rugged, easily assembled and relatively portable educational devices of the type described, known devices, although satisfactory in some respects, do not possess the combined advantages of being relatively inexpensive, rugged, easily assembled and relatively portable when compared to the novel and advantageous device of the present invention.

SUMMARY OF THE INVENTION

It is therefore an object of the present invention to overcome the disadvantages stated hereinabove and to provide an educational device which is simpler, more durable, less expensive, more easily assembled and still more pleasing from a design viewpoint, than prior art devices and otherwise more suitable for use in learning institutions below the college level.

It is a further object of the present invention to provide an educational device for demonstrating pressure-volume relationships.

It is a further object of this invention to provide an educational device which is compact when assembled.

It is a further object of this invention to provide an educational device which is easily assembled and quickly disassembled for easy storage in a very small space.

It is a further object of this invention to provide an educational device which does not require a single screw, bolt, rivet or similar fastening type connection.

It is still a further object of this invention to provide an educational device which, in addition to its educational features and many mechanical advantages, possesses a pleasing design.

The foregoing objects and others are accomplished in accordance with the present invention by providing an educational device comprising a chamber for containing a gas, said chamber having openings at its upper and lower end portions; piston means for selectively controlling the volume and pressure of the gas in said chamber, said piston means capable of being inserted in said chamber through said opening located in the upper end portion of said chamber; means for sealing the opening in the lower end portion of said chamber; and a base member for supporting said chamber at its lower end portion, said base member adapted to be in releasable engagement with said chamber.

BRIEF DESCRIPTION OF THE DRAWINGS

For a better understanding of the invention as well as other objects and further features thereof, reference is made to the following detailed disclosure of this invention taken in conjunction with the accompanying drawings wherein.

DESCRIPTION OF THE PREFERRED EMBODIMENTS

Figure 1:
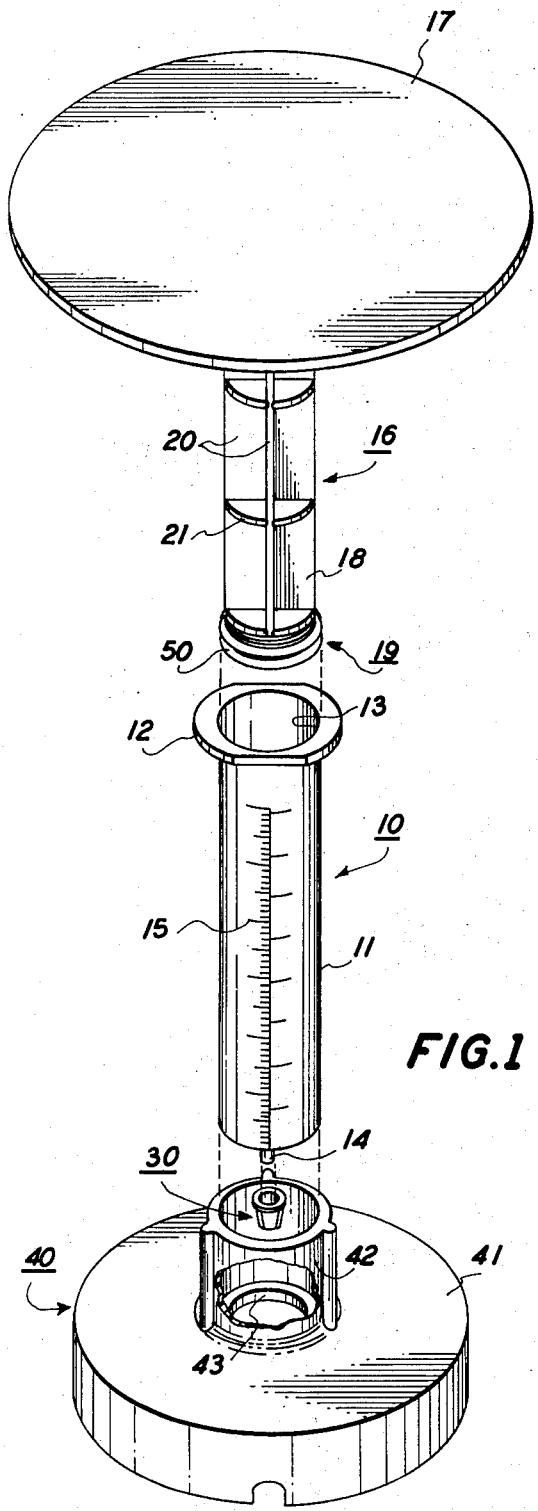
FIG. 1 is a partially sectioned perspective view of a preferred embodiment of an educational device in accordance with the invention shown in disassembly with the component parts shown in relative position.

Referring now to FIG. 1, the educational device in accordance with the features of this invention is shown in disassembly for ease of understanding to comprise a chamber 10 for containing a gas, such as for example, air. The chamber preferably includes a tubular body 11 having flange 12 which surrounds a substantially circular opening 13 located at the upper end portion of the chamber. Extending vertically from the bottom portion of the chamber is nozzle 14 which includes an opening (not shown) at its tip which is substantially smaller than opening 13. Located along the outer surface of tubular body 11 is a calibrated scale 15 which enables one to measure the volume of gas within the chamber, the scale preferably being marked in units of cubic centimeters. In accordance with the invention the size of chamber 10 can vary. Thus, for example, chambers calibrated to contain 20cc, 40cc, 60cc, etc. of a gas can be used.

Piston means 16 which is inserted into chamber 10 through opening 13 for varying the volume and/or pressurizing the gas within the chamber includes supporting surface 17, elongated member 18, and rubber tip member 19. Supporting surface 17 is employed to enable one to apply a force to elongated member 18 and thereby alter the volume and/or pressure of the gas within the chamber. This can be accomplished in numerous ways. For example, by applying a force to support surface 17 with one's hand or by placing a weight or plurality of weights on surface 17. Although a preferred shape for the supporting surface is circular, the supporting surface could be constructed in the form of other shapes, such as for example, a square, a rectangle, etc. Elongated member 18 which extends vertically from the bottom portion of supporting surface 17 is is preferably constructed of a plurality of vertical ribs 20 and a plurality of substantially circular horizontal ribs 21 which intersect the vertical ribs along their length. These ribs impart strength and rigidity to the elongated member and the overall piston structure. The physical dimensions of ribs 20 and 21 permit elongated member 18 to be inserted within chamber 10 through opening 13 without causing frictional contact between the ribs and the inside surface of tubular body 11 as the piston is inserted and withdrawn from chamber 10. Secured to the bottom portion of elongated member 18 is a substantially circular rubber tip member 19 whose diameter is such that when it is inserted within tubular body 11 it can slide back and forth within the tubular body and also create a seal. Thus, for example, when piston means 16 is inserted within opening 13 and a force is applied in a downward direction to supporting surface 17, the gas within tubular body 11 will be compressed, when the opening in nozzle 14 is closed. Rubber tip member 19 is constructed to be in releasable engagement with the bottom portion of piston 16.

Figure 2:
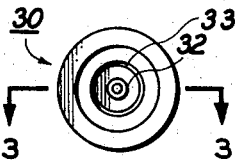
FIG. 2 is a top view of a preferred embodiment of the sealing means as shown in FIG. 1.
Figure 3:
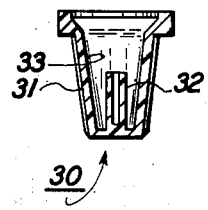
FIG. 3 is a sectional view of the sealing means taken along line A—A of FIG. 2.

To securely seal the opening in nozzle 14 cap 30 is provided. As shown in FIGS. 2 and 3, cap 30 includes a cup-like body 31 with an upstanding internal projection 32. When cap 30 is placed over the bottom portion of the nozzle, projection 32 is inserted within the opening in the nozzle and the wall of the nozzle rests within shoulder 33.

Chamber 10 is designed to be supported by base member 40. Preferably, base member 40 includes platform 41 with tubular support means 42 projecting upwardly therefrom. The internal diameter of tubular support means 42 is sized to allow tubular body 11 to fit securely therein, the bottom portion of the tubular body resting on shoulder 43. When desired chamber 10 is disengaged from base member 40 by simply sliding the tubular body out of tubular support means 42. Although a preferred shape for platform 41 is circular, the platform could be constructed in the form of other shapes, such as for example, a square, rectangle, etc.

Figure 4:
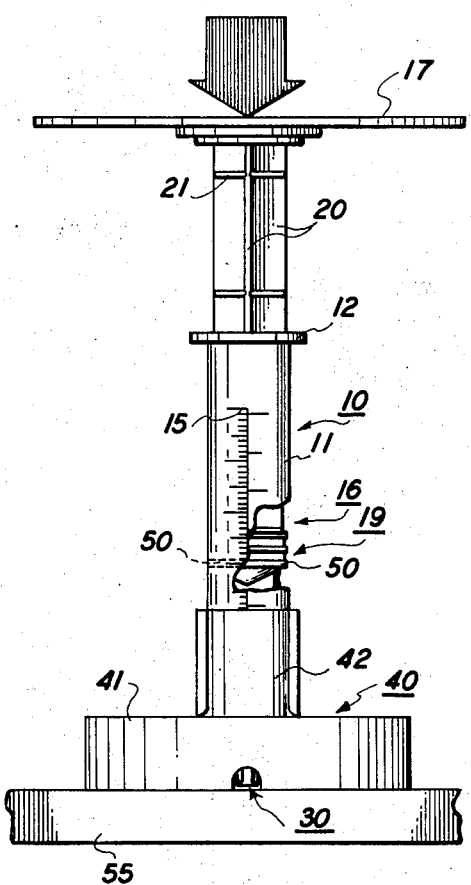
FIG. 4 is a partially sectioned front view of an assembled device in accordance with the invention.

In operating the educational device described herein piston means 16 including rubber tip member 19 secured to the bottom portion of the piston is inserted into opening 13 in chamber 10. To allow the piston to move freely up and down within tubular body 11 it is preferred to lubricate the rubber tip 19 with a lubricant, such as for example, a liquid detergent, glycerine, etc. To put a desired volume of gas into the chamber, the piston is pushed down by applying a force on supporting surface 17 as illustrated in FIG. 4 until the bottom portion of rubber tip member 19 coincides with the desired volume of gas as indicated on calibrated scale 15. The rubber tip member includes at least one rib 50 which appears as a dark line when viewed from the outside of tubular body 11 when the piston is inserted within the tubular body. This effect is achieved by employing a tubular body constructed of a translucent material. This creates a readout indicator which enables one to read the volume of gas within the chamber. When the desired volume of gas is enclosed with the chamber, cap 30 is placed securely on nozzle 14. Thereafter, chamber 10 is secured to base member 40 which can be placed on a support surface, such as for example, a table 55. This is illustrated in FIG. 4.

In accordance with the present invention various suitable materials may be used for manufacturing the various parts of the educational device herein described. However, in accordance with the preferred embodiments of this invention, the chamber 10, piston means 16, sealing means 30 and base member 40 are all preferably constructed of plastic. In accordance with the disclosed embodiment it is particularly preferred that chamber 10 be constructed of a translucent plastic. Furthermore, to strengthen base member 40 vertical ribs 43 can be included around the circumference of tubular support means 42. Additionally, if desired, vertical ribscan extend around the circumference of platform 41.

The educational device of the present invention is designed to allow the student to study pressure-volume relationships in numerous ways. The students can measure the volume of a confined gas at various pressures both above and below atmospheric pressure. Students can graph and interpret data which requires that a distinction be made between force and pressure, and this leads to an operational definition of pressure. While working with the educational device of this invention, the students will be concerned with the concept of force and also with the area on which a force is acting (pressure is force per unit area).

By applying a force to supporting surface 17 as shown in FIG. 4 the students can be taught that when the downward force on piston 16 is greater than the upward force of the air in chamber 10, the piston will move down. Further, when the downward force on the piston is equal to the force exerted by compressed air in the chamber, the piston will not move. In this activity the students can be taught that as the force on the piston increases, the volume of the air in the chamber decreases. By using an educational device in accordance with the present invention students can also be taught the effect of forces on the air contained in chambers of different size, e.g. the effect which equal forces have on the change in the volume of the air in chambers of varying diameters.

Various types of experiments which can be performed by students using the educational device of this invention are explained in detail in "Science — A Process Approach/Part G, Pressure-Volume Relationships" published by the American Association for the Advancement of Science.

It will be seen from the foregoing description that a very simple, durable and relatively inexpensive educational device for demonstrating pressure-volume relationships has been devised. The educational device described herein has the additional advantages of being rugged, easily assembled, relatively portable and demonstrates the ability to perform experiments which can be substantially duplicated.

While we have illustrated and described a particular embodiment of our invention, it will be understood that various modifications may be made therein without departing from the spirit of the invention and the scope of the appended claims.

We claim:

1. An educational device for demonstrating pressure-volume relationships comprising a chamber for containing a gas, said chamber having openings at its upper and lower end portions; piston means for selectively controlling the volume and pressure of the gas in said chamber including a support adapted to hold a weight, secured to one end portion of the piston means, said means capable of being inserted in said chamber through said opening in the upper end portion of said chamber; means for sealing the opening in the lower end portion of said chamber; and a base member for supporting said chamber at its lower end portion, said base member including a platform and a tubular support means projecting from said platform, said tubular support means including a shoulder whereby said chamber is adapted to fit in slidable relationship within said tubular support means and be supported by said shoulder.

2. An educational device according to claim 1 wherein said chamber includes a tubular body having a nozzle extending from its lower end portion, one of said openings being in the lower portion of said nozzle.

3. An educational device according to claim 2 wherein said tubular body includes a calibrated scale extending vertically along said body to indicate the volume of gas within said chamber.

4. An educational device according to claim 1 wherein said upper opening is larger than said lower opening.

5. An educational device according to claim 1 wherein said gas is air.

6. An educational device according to claim 1 wherein said piston means comprises an elongated member, said support surface secured to one end of said elongated member and a rubber tip member secured to the opposite end of said elongated member, said rubber tip member being adapted to slide within said chamber and create a seal within said chamber.

7. An educational device according to claim 6 wherein said support surface is substantially circular.

8. An educational device according to claim 6 wherein said elongated member includes a plurality of vertical ribs intersected at intervals along their length by a plurality of substantially circular ribs.

9. An educational device according to claim 1 wherein said chamber is adapted to fit within said tubular support means and be in slidable relationship thereto.

10. An educational device according to claim 1 wherein said chamber is constructed of a translucent plastic.

11. An educational device according to claim 2 wherein said sealing means is a cap adapted to be placed over the opening in said nozzle.

* * * * *